Figure 2:
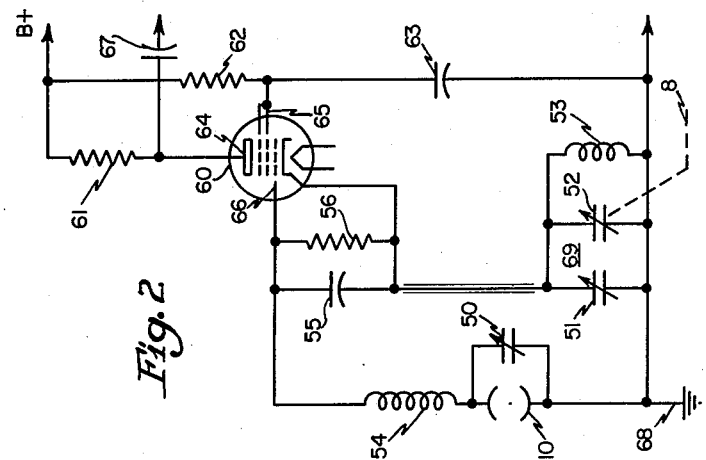

Jan. 5, 1960

A. C. ERDMAN ET AL 2,920,272

MOISTURE MEASURING SYSTEM

Filed Jan. 9, 1957

2 Sheets-Sheet 1

INVENTORS
ARTHUR C. ERDMAN
SIDNEY A. RADLEY

By Anthony D. Cennamo

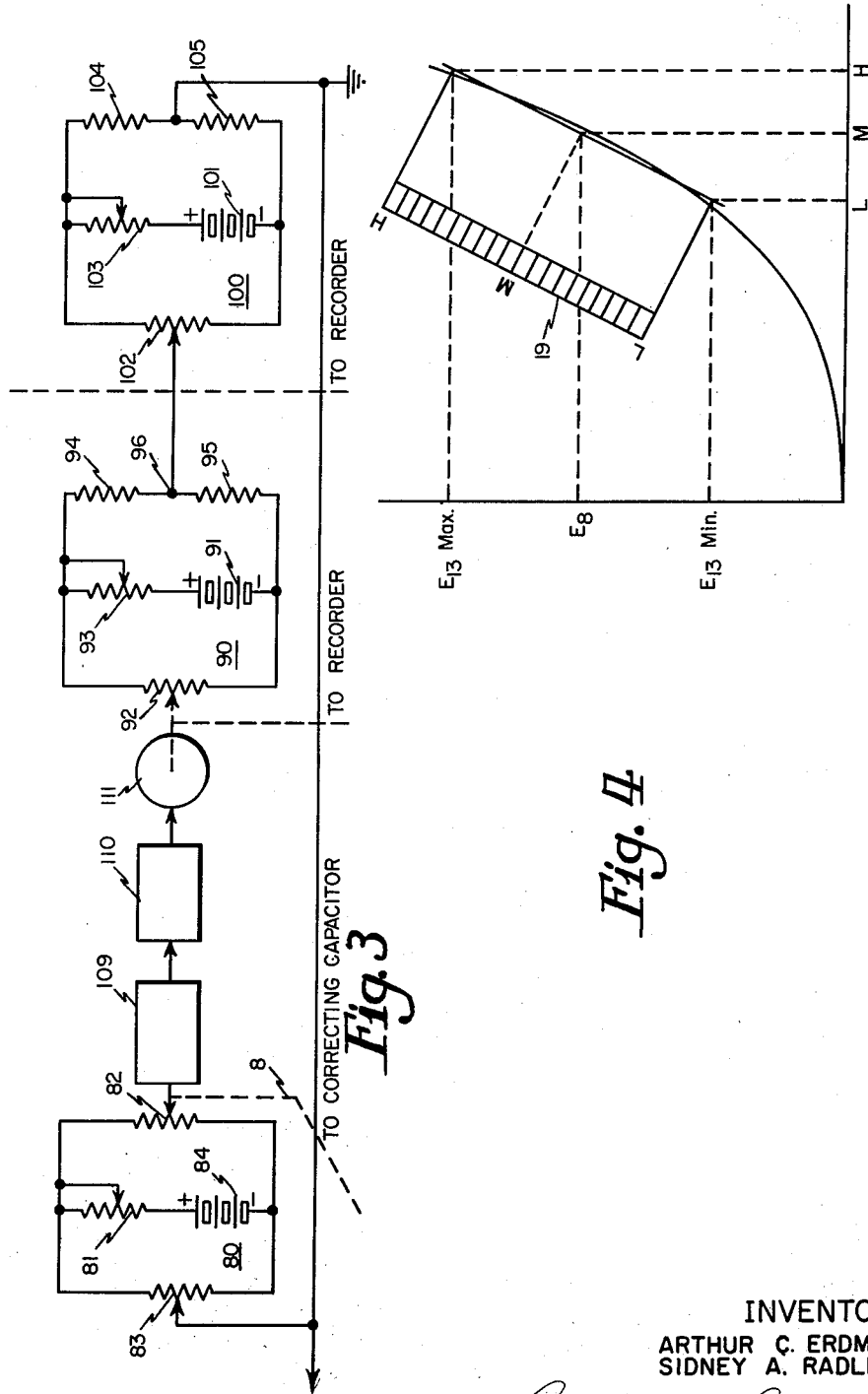

United States Patent Office 2,920,272
Patented Jan. 5, 1960

2,920,272

MOISTURE MEASURING SYSTEM

Arthur C. Erdman and Sidney A. Radley, Columbus, Ohio, assignors to Industrial Nucleonics Corporation Application January 9, 1957, Serial No. 633,290

8 Claims. (Cl. 324—61)

This invention relates generally to moisture gauges for a traveling material and particularly to method and means for continuously correcting a moisture gauge for indications of moisture variations caused by variations in the mass of the material.

There are many known systems that utilize a moisture gauge for the measurement of moisture in a traveling material and particularly in measuring the amount of moisture in a stream of tobacco, a cigarette rod, textile fabrics or slivers, paper, and synthetic plastics. The most notable of these moisture gauges is the gauge that measures the electrical properties of the material such as the capacitor type detector. In these moisture gauges there is the inherent disadvantage, when incorporated in a practicable embodiment, that the amount of moisture is affected by the mass of the material.

It is apparent that an increase in the mass of the material also results in an increase in moisture and, accordingly, an increased response in the moisture indicator. Therefore, unless the mass of the traveling material is known at every instance the relative percentage of moisture cannot be determined, and the resulting indication may be a function of the mass of the material rather than the moisture percentage.

The present invention is a capacitance type gauge system for measuring the percentage or amount of moisture in a traveling material and overcomes the difficulty of prior systems by continuously correcting the capacitance gauge readings in accordance with mass changes. Converting the total moisture to percent moisture is accomplished by combining the absolute moisture response with the simultaneous readings of a radiation weight or mass gauge.

It is accordingly a general object of the present invention to provide a new and improved system for measuring moisture.

It is also an object of the present invention to provide a new and improved system for measuring moisture in a traveling material.

A further object of the present invention is to provide a new and improved system for measuring moisture in a traveling material wherein the response may be interpreted.

Another object of the invention is to provide a new and improved moisture measuring system wherein the resulting indication is not a function of the mass of the material.

Another object of the present invention is to provide a system for measuring moisture in a traveling material and to compensate for moisture variations resulting from variations in mass.

Still another object of the present invention is to provide a system for determining the percentage of moisture in a traveling material and to correct for variations in the moisture content in the material.

Figure 1:
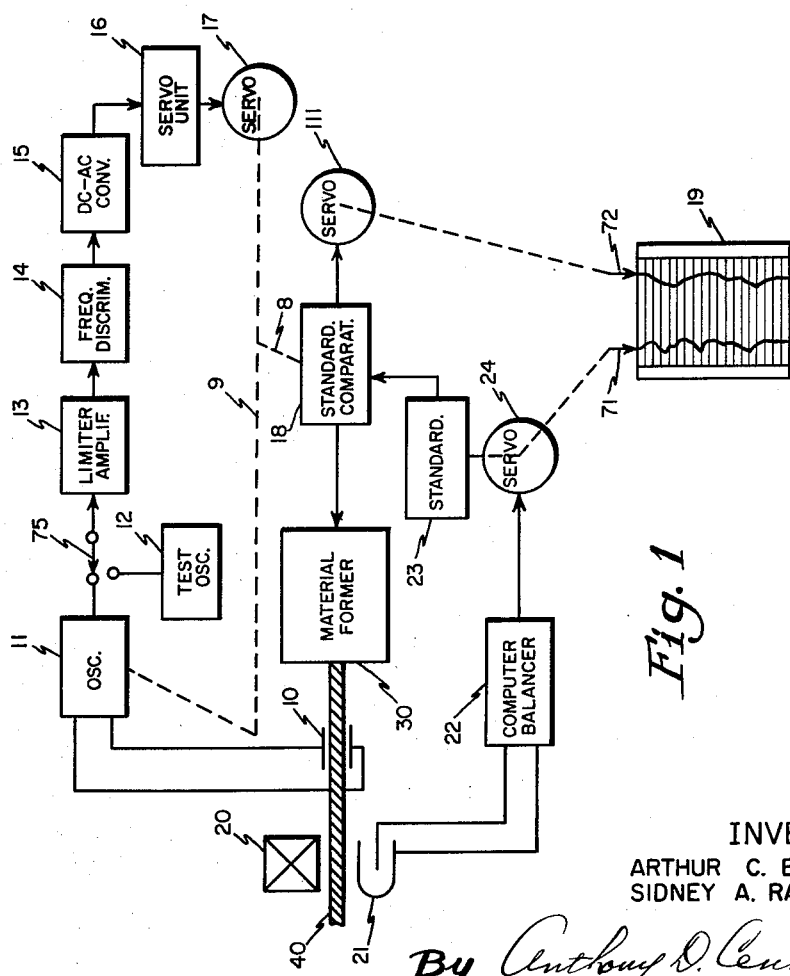

Other objects and attainments of the present invention will become apparent upon a careful consideration of the following detailed description when taken in conjunction with the drawings in which:

Figure 1 is a block-schematic diagram of a preferred embodiment of the present invention utilizing a capacitance gauge for measuring moisture, Figure 2 is a schematic circuit diagram of oscillator circuit incorporated in the embodiment of Figure 1, Figure 3 is a schematic circuit diagram of the standardizing circuit of Figure 1 and, Figure 4 is a readout voltage vs percent moisture graph for purposes of explaining the operation of the embodiment of Figure 1.

Referring now to the drawings and particularly to Figure 1 there is shown a block schematic diagram of a moisture measuring system of the present invention. The preferred embodiment of Figure 1 comprises very basically a capacitance moisture measuring system for a traveling material operable in conjunction with a radiation gauge for continuously correcting the moisture responses in accordance with variations in the mass of the material, an indicator reading out true moisture variations and a controller to control the moisture content in the material. The present invention is described for purposes of simplicity and clarity in conjunction with a capacitance type of moisture gauge. It is not intended that the invention be limited to a capacitance gauge and it is to be understood that a resistance, hygroscopic or any other type of moisture gauge may readily be substituted without departing from the true spirit of the invention. Also in a similar manner, although a radiation gauge is preferred as an accurate mass measuring means, any other known means for indicating the mass of a traveling material may be incorporated in the system of this invention.

In particular there is shown in Figure 1, a block 30 indicative of a material former. This former may be a rod, sheet, sliver forming or making machine or bulk assembler of material with or without resins or binders. This machine continuously dispenses or intermittently moves its product, indicated at 40, which is herein referred to as a traveling material. As appreciated in industry, and which detail elaboration is not necessary, the moisture content of many products must be known to provide a certain amount of quality control. To indicate moisture content in the traveling material 40 and to control its moisture content, there is shown in Figure 1 a capacitance type of moisture gauge. Capacitor 10 is shown as having each of its plates placed adjacent to the sides of the material and in practice forms a part of the tuned circuit in oscillator 11. Capacitor 10 may be of a shape and size to conform to the material being gauged, i.e., if the material 40 is a rod the plate may be a semicircular passtube, if the material 40 is a sheet the plates could be flat and disposed above and below the sheet, or both above or below the sheet, and similarly if the material is bulk the plates could be elongated and displaced at either side of the material. A variation in the moisture content of the traveling material 40 will be reflected in a change in the reactance of capacitor 10, and, as hereinafter explained in conjunction with Figures 2 and 3, any electrical differences in capacitor 10 will vary the frequency of oscillator 11. The frequency of oscillator 11 is very accurately adjustable to be equal to that of the stabilized frequency of oscillator 12. In setting the parameters of oscillator 11 to tune the frequency of this oscillator to that of the stabilized oscillator 12 a standard sample of material with the desired amount of moisture may be placed between the plates of capacitor 10.

The radio-frequency signal generated by oscillator 11 is fed to the limiter and amplifier 13 and then to discriminator 14. These circuits are also tuned to the peak frequency of the stabilized oscillator 12. When the capacitance of 10 is constant, i.e., when the material 40 is of the desired moisture content, the signal generated by oscillator 11 will be on center frequency with that of the stabilized oscillator 12 and there will be no output from the discriminator 14. When a variation in capacitance of capacitor 10 due to a change in moisture content of material 40 causes a change in the radio frequency signal of oscillator 11 which may be above the center frequency of oscillator 12 there will be a D.C. output from the discriminator 14 of a certain polarity; and when a variation in the capacitance of capacitor 10 causes a variation in the radio frequency signal of oscillator 11 to be below that of oscillator 12 there will be a D.C. output of the opposite polarity.

Although each of the circuits indicated in blocks 12, 13 and 14 are deliberately adapted to form a preferred embodiment of the invention they are generally described for purposes of illustrating the principles of the invention and equivalent detailed circuitry for deriving a difference voltage may be substituted. It was found that if the frequency of oscillator 12 is at a suitably low frequency, preferably in the kilocycle range, it is easier to maintain overall circuit stability, and the response of the instrument is more exclusively a function of moisture content.

Stabilization and monitoring of the circuits of oscillator 11, limiter and amplifier 13 and discriminator 14 with respect to a reference frequency can be effected by replacing variable oscillator 11 with the fixed oscillator 12. This can be done by throwing switch 75 shown as having a center arm and a pair of contacts. This switch is, of course, merely illustrative and may in an actual embodiment take the form of an electrical or electronic switch and may also be so arranged to provide automatic and periodic monitoring. These switching circuits could further have incorporated therein automatic means to realign the parameters of the tuned circuits of oscillator 11, limiter-amplifier 13 and frequency discriminator 14 in accordance with deviation from the center of peak frequency of oscillator 12.

The output of the discriminator 14 is converted to an A.C. voltage in the D.C.-A.C. converter shown at 15. This circuit could be a chopper such as those that are commercially avilable for this purpose. The output voltage from converter 15 is amplified by servo unit 16 and then applied to a servo motor 17. Servo 17 is indicated in Figure 1, by dotted lines, as having its shaft connected to the oscillator 11. As will be shown hereinafter in conjunction with Figure 2, the shaft 9 of servo motor is connected to a variable capacitor in the tuned network of oscillator 11. The purpose of driving this variable capacitor is to return the oscillator 11, when its frequency has changed due to a varying amount of moisture in the traveling material 40, to the center frequency of the fixed stable oscillator 12.

In the operation of this measuring system no attempt is made to measure the frequency deviation and the frequency deviation is merely a means for providing a voltage to adjust the angular position of the rotor of the servo 17. This angular position of the rotor of the servo 17 is indicative of the total moisture content of the traveling material 40.

The rotor of the servo motor is also indicated in Figure 1 as being connected by shaft 8 to a standardizing and comparator circuit 18. The standardizing and comparator circuit 18 is described in more detail with Figure 3 and will suffice here to say that this circuit provides a voltage to a servo 111 which drives slidewire arm 72 of the indicator 19 to indicate the percentage of moisture content of the traveling material 40.

Assuming that the percentage by weight of moisture in the material remains constant, it can be seen that an increase in the weight of material also results in an increase in the amount of moisture passing through the measuring capacitor, and thus results in an increased response of the moisture gauge. Therefore, if the moisture gauge is to read in terms of percentage moisture in the material, the capacitance gauge response must be continuously corrected by means of an accurate weight gauge.

Also shown in Figure 1 are the circuits that form a radiation gauge system used in conjunction with the capacitance moisture measuring system to measure the mass or weight of the material in order to continuously correct the capacitance gauge read out. The radiation gauge preferably employs a beta radiation source although other electromagnetic or corpuscular sources may be utilized in a similar manner and dependant upon the material being measured. Radiation is transmitted from the source 20 through the traveling material 40 and is collected by the detector 21. In certain instances it may be preferred to employ the backscatter head, that is, where the source and detector are mounted together on the same side of the material. Detector 21 functions as a high resistance whose impedance varies as an inverse function of the intensity of the received radiation and could be an ionization chamber or other known means and dependant on the source used. The current from detector 21 is fed to a computer-balancer generally indicated as 22, and its output is fed via servo 24 to the standardizing circuit 23, whose operation is similar to standardizer 18. The output of servo 24 also provides a voltage reading to indicator 19 indicative of weight of the traveling material 40.

Returning now for a more detailed operation of the moisture measuring system of the present invention, reference is made to Figure 2 wherein there is shown a schematic circuit of oscillator 11 utilized in the preferred embodiment. Capacitor 10, as previously indicated, is in a series circuit with inductance 54 connected between ground 68 and grid 66 of oscillator tube 60. This inductive circuit provides the inductive reactance of the tuned circuit, while the capacitive reactance is provided by the series-connected capacitors 55 and 51 with 52; oscillations being sustained in the electron coupled manner through screen grid 65 and capacitor 63. The inductive reactance of inductance 53 is large enough so that it does not affect the oscillatory circuit and serves as the cathode D.C. return for the oscillator tube 60. Resistor 61 connected to the plate 64 and resistor 62 connected to grid 65 are load resistors from the source of B+. Capacitors 51 and 52 are in the tuning circuit 69 and although shown in this embodiment together with the oscillator circuit for purposes of simplicity are actually in the servo unit 16 of Figure 1. In that instance shaft 9 of Figure 1 indicated as connected to oscillator 11 may be replaced by a coaxial cable. This may be accomplished since, as described hereinafter, capacitor combination 51 and 52 is relatively large and therefore may be remotely connected without affecting its capacitance.

In order to restore the oscillator circuit to a null balance with the frequency of the test oscillator 12, as hereintofore mentioned, the shaft 9 of servo motor 17 is connected to the rotor of variable capacitor 52 which resets the tuned circuit to compensate for the capacitance variations in capacitor 10 thereby maintaining the oscillations at the set frequency of the test oscillator 12.

The oscillator circuit of Figure 2 is readily adaptable to an application wherein the size of the measuring capacitor must be small capacitance wise. Accordingly, this oscillator circuit is particularly adaptable to the preferred embodiment where the capacitance is necessarily small because either of small rod or sliver area or because of wide spacing of bulk material being measured. The circuit has good sensitivity while operating at a relatively low frequency, which minimizes the difficulties of eliminating stray capacitance effects while taking better advantage of resistance and dielectric changes in the measured material as a result of moisture variations.

It has been found that the combination of capacitors 10 and 50 is about 50 micromicrofarads. Since capacitor 50 was set around the middle of its range, the measuring capacitor 10 has a value of about 25 micromicrofarads. The change in apparent capacitance of capacitor 10 due to moisture changes in the material is probably not more than 1 micromicrofarads over the entire measuring range. On the other hand, several hundred micromicrofarads of change in capacitor combination 51 and 52 is required to compensate for this slight variation.

It can be seen that if the capacitance of 10 and 50 is increased by 1 micromicrofarad, for example, several hundred micromicrofarads must be subtracted from the total capacitance in the circuit 69 to restore operation at the same frequency. This means that the correcting capacitor 52 becomes a much larger portion of the total capacitance in 69, resulting in an increase in the sensitivity of the servo system to moisture changes.

This increase would be quite large except that it is partially cancelled to a very great extent by two other factors: (1) If the capacity in series with the coil 54 increases, the net inductive reactance $jX_L$ (which is equal to the sum of $jX_L'$ from coil 54 and $-jX_C$ from capacitors 10 and 50) becomes larger, so that the reactance changes due to measuring capacitance changes are a smaller portion of the total reactance. (2) For a smaller effect, an increase in the total capacity in series with the coil 54 means that measuring capacitance changes are a smaller portion of the total capacitance.

For a clearer understanding of the standardizing and comparator circuit 18 reference may now be had to Figure 3. The arm of potentiometer 82, in that part of the circuit indicated generally as 80, is mechanically coupled to the shaft 8 of servo motor 17 of Figure 1 and correcting capacitor 52, so that the angular position of the variable element of capacitor 52 is translated into the D.C. voltage (with respect to ground) appearing at the arm of potentiometer 82. The reference point of this readout voltage is adjustable by means of potentiometer 83 which in practice may be equipped with a dial having a center scale. The voltage span represented by a given increment of angular rotation of potentiometer 82 is also adjustable by means of potentiometer 81.

That part of the circuit of Figure 3 indicated generally as 90 is a bucking voltage source or comparator circuit which also includes a battery 91, a "sensitivity" or span adjusting potentiometer 93, and a bridge circuit containing two matched precision resistors 94 and 95, and a slidewire potentiometer 93 in a closed loop. At 109, 110 and 111 respectively are another converter, amplifier and servo motor. The servo motor 111 drives the slidewire 92 as well as the pen and pointer mechanism 71 of the recorder in 19 of Figure 1 for a continuous moisture indication.

In operation, assume that point 96 at the junction of resistors 94 and 95 is at ground potential, it is apparent that whenever there is a slight difference between the voltage at 82 and the voltage at 92 which would result in current flow through the converter 109, the servo motor 111 will readjust the slidewire on potentiometer 92 to restore balance.

That part of the circuit of Figure 3 shown generally as 100 provides means whereby the moisture reading applied to indicator 19 of Figure 1 is continuously corrected for mass variations in the traveling material. As described in conjunction with Figure 1, the radiation gauge output is a D.C. signal which varies in proportion to the mass of the traveling material. Referring again to Figure 1 in conjunction with Figure 3 this signal from detector 21 is fed in opposition to a variable bucking voltage from a balancing bridge in the computer-balancer circuit 22. The computer-balancer output effects a mechanical positioning of slidewire arm 71 by servo means 24 which also drives a repeat slidewire potentiometer 102 in the standardizing circuit 100 and which circuit is operable substantially similar to the circuit indicated generally as 80 of Figure 3. The output from the radiation gauge that drives the servo 24 is also utilized by the radiation gauge part 71 of recorder 19 to provide a continuous weight reading on the same chart with the moisture reading. The voltage of the repeat slidewire 102 also provides the correction voltage for the moisture reading. This is accomplished by connecting potentiometer 102 to center point 96 of the circuit 90. The magnitude of the correction voltage change for a given weight change is adjustable by means of potentiometer 103 in the bridge circuit 100.

It is apparent from the foregoing that in operation, the point 96 of the comparator circuit 90 as previously described, instead of being fixed at ground potential will vary in potential in accordance with the weight indication of the traveling material. A variation in voltage at point 96 is equivalent to a voltage variation which could be obtained by changing the setting of the center scale potentiometer 83. This correction means takes care of the discrepancy between the uncorrected moisture gauge readings and the true percentage moisture.

Recorder 19 is a recorder system for visual presentation and for permanently recording the moisture content of the material and the slidewire arms 71 and 72 are associated with the indicating and marking pens of the conventional two-pen recorder. It is understood that any other means for performing this operation may be substituted.

The final operation of the system is to provide control of the amount of moisture in the material as it is being formed in former 30 of Figure 1. The percentage moisture indication provided by the moisture arm 72 of indicator 19 may be utilized by an operator to correct the liquid mixture, blotting rollers, dryers, heaters and so on, in the former 30 to regulate manually the percentage of moisture in the traveling material 40. Alternately a corrected voltage output derived from the standardizing and comparator circuit 18 may be fed by suitable servo systems to an automatic controller means within the former, to automatically control the percentage of moisture of the material 40.

The graph of Figure 4 shows a typical curve plotted for readout voltage as a function of the percentage moisture by weight. This voltage is derived from the arm of potentiometer 82 of Figure 3 and is proportional to the angular position of the correcting capacitor 52 of Figure 2 when the system is at a point of balance.

Depending on the range of moisture percentages (L to H) which it is desired to place on the scale 72 of indicator 19, it can be seen that the readings of the instrument are a linear approximation to the curve over the range L to H. This is illustrated on the graph of Figure 4 where such a straight-line function is shown projected onto a representation of a typical recorder scale utilized by indicator 19.

The voltage between point 96 and the arm of 92 of Figure 3 is zero when the slidewire arm 72 is in its center of scale of the indicator 19. Also, since the voltage derived from the arm of potentiometer 82 is always taken with reference to the voltage at the arm of potentiometer 83, potentiometer 83 can be set so that the output of the readout voltage source is zero for any given setting of potentiometer 82. Therefore by adjusting the value of the reference voltage $E_8$ by means of the "center scale" dial potentiometer 83, the midpoint of the recorder scale can be made to correspond with any desired center value of (e.g. moisture percentage) M.

The range of bucking voltages available for end-to-end movement of the slidewire 92 is adjustable by means of the sensitivity dial potentiometer 93. Any desired voltage span, $E_7$ minimum to $E_7$ maximum, shown on Figure 4, corresponding to the selected range of moisture percentages from L to H can therefore be conveniently set on the instrument slidewire by means of potentiometer 93.

Therefore, any appropriate scale may be placed on the recorder, and the instrument adjusted for accurate readings with respect to that scale by adjusting potentiometers 83 and 93 in accordance with the pre-established curve.

Although I have shown only certain and specific embodiments of the present invention, it is readily understood that modifications are possible without departing from the true spirit of the invention.

What is claimed is:

1. A system for measuring the amount of moisture in a traveling material, comprising a measuring capacitor adjacent to said material, a driving oscillator circuit including an electronic discharge device having at least an input and an output component, a tuned circuit having a parallel connected inductive branch and a capacitive branch connected to said input component for determining the frequency of said oscillator, said inductive branch including said measuring capacitor whereby changes in the dielectric and resistance properties of said material modify the inductive reactance of said inductive branch of said tuned circuit to vary the frequency of said oscillator, means connected to said output component for converting any frequency variation of said oscillator output to a signal voltage, and means responsive to said signal voltage for varying the capacitive reactance of said capacitive branch so as to maintain the frequency of said oscillator substantially constant.

2. A measuring system as in claim 1 including a fixed-frequency oscillator, switch means for disconnecting said driving oscillator output component from said frequency variation converting means and for alternatively connecting the output of said fixed-frequency oscillator thereto, and means for adjusting said converting means to reduce said signal voltage to zero at said fixed frequency.

3. A measuring system as in claim 1 wherein said capacitive reactance varying means comprises a variable capacitor, an electromechanical servomechanism including motor means for driving said variable capacitor, and indicator means responsive to the position of the variable element of said variable capacitor for indicating the amount of moisture in said material.

4. A measuring system as set forth in claim 3 wherein said inductive branch of said tuned circuit comprises an inductance in series connection with said measuring capacitor, the value of said inductance being so chosen that the change in the reactance of said variable capacitor required to restore a given frequency variation exceeds the change in reactance of said measuring capacitor producing said variation by a factor of at least one hundred.

5. A system for measuring the percentage of moisture in a traveling material, comprising a measuring capacitor adjacent to said material, a driving oscillator circuit including an electronic discharge device having at least an input and an output component, a tuned circuit having a parallel connected inductive branch and a capacitive branch connected to said input component for determining the frequency of said oscillator, said inductive branch including said measuring capacitor whereby changes in the dielectric and resistance properties of said material modify the inductive reactance of said inductive branch of said tuned circuit to vary the frequency of said oscillator, means connected to said output component for converting any frequency variation of said oscillator output to a signal voltage, means responsive to said signal voltage for varying the capacitive reactance of said capacitive branch so as to maintain the frequency of said oscillator substantially constant, a source of penetrative radiation positioned on one side of said traveling material, a radiation detector positioned on the opposite side thereof, a first generator means responsive to the output of said detector for generating a voltage indicative of the mass of said material, a second generator means responsive to said reactance variation of said capactive branch for generating a voltage indicative of the amount of moisture in said material, a voltage comparator circuit to compare the voltages of said first and second generators and including means to correct said moisture voltage in accordance with the mass of said material, and indicating means having connected thereto the corrected voltage of said comparator circuit to indicate the percentage of moisture in said traveling material.

6. A measuring system substantially as set forth in claim 5 wherein said comparator network is a bridge circuit comprising a plurality of serially-connected impedance elements forming a closed loop, means for connecting the output of said first voltage generator to a first vertex on said bridge and means for connecting the output of said second voltage generator to a second vertex on said bridge.

7. A measuring system substantially as set forth in claim 5 wherein said comparator network is a bridge circuit comprising a plurality of serially-connected impedance elements forming a closed loop, a source of potential and an adjustable impedance for adjusting the span of said network connected within said loop, means for connecting the output of said first voltage generator to a first vertex on said bridge and means for connecting the output of said second voltage generator to a second vertex on said bridge.

8. A system for controlling the percentage of moisture in a traveling material former having a moisture controlling element therein, comprising a measuring capacitor adjacent to said material, a driving oscillator circuit including an electronic discharge device having at least an input and an output component, a tuned circuit having a parallel connected inductive branch and a capacitive branch connected to said input component for determining the frequency of said oscillator, said inductive branch including said measuring capacitor whereby changes in the dielectric and resistance properties of said material modify the inductive reactance of said inductive branch of said tuned circuit to vary the frequency of said oscillator, means connected to said output component for converting any frequency variation of said oscillator output to a signal voltage, means responsive to said signal voltage for varying the capacitive reactance of said capacitive branch so as to maintain the frequency of said oscillator substantially constant, a source of penetrative radiation positioned on one side of said traveling material, a radiation detector positioned on the opposite side thereof, a first generator means responsive to the output of said detector for generating a voltage indicative of the mass of said material, a second generator means responsive to said reactance variaton of said capacitive branch for generating a voltage indicative of the amount of moisture in said material, a voltage comparator circuit to compare the voltages of said first and second generators and including means to correct said moisture voltage in accordance with the mass of said material, indicating means having connected thereto the corrected voltage of said comparator circuit to indicate the percentage of moisture in said traveling material, and means connecting the corrected voltage from said comparator circuit to said moisture controlling element in said material former.

References Cited in the file of this patent

UNITED STATES PATENTS

| | | |
|---|---|---|
| 1,379,266 | Keeler | May 24, 1921 |
| 1,878,109 | Clark | Sept. 20, 1932 |
| 2,222,221 | Burford | Nov. 19, 1940 |
| 2,387,496 | Cornelius | Oct. 23, 1945 |

(Other references on following page)

UNITED STATES PATENTS

| | | |
|---|---|---|
| 2,488,269 | Clapp | Nov. 15, 1949 |
| 2,588,882 | Rolfson | Mar. 11, 1952 |
| 2,607,830 | Razek | Aug. 19, 1952 |
| 2,768,629 | Maul | Oct. 30, 1956 |

FOREIGN PATENTS

| | | |
|---|---|---|
| 591,172 | Great Britain | Sept. 11, 1945 |
| 745,917 | Great Britain | Mar. 7, 1956 |

OTHER REFERENCES

Howe: "Applications of Dielectric Meas. to Continuous Processes," Instruments, vol. 24, December 1951, pages 1434–1438. (Copy in Scientific Library or Division 48.)